(12) United States Patent
Sturek

(10) Patent No.: US 11,032,094 B2
(45) Date of Patent: Jun. 8, 2021

(54) OPTIMIZED MULTICAST GROUP FORWARDING

(71) Applicant: Itron, Inc., Liberty Lake, WA (US)

(72) Inventor: Donald Eugene Sturek, Liberty Lake, WA (US)

(73) Assignee: Itron, Inc., Liberty Lake, WA (US)

(*) Notice: Subject to any disclaimer, the term of this patent is extended or adjusted under 35 U.S.C. 154(b) by 0 days.

(21) Appl. No.: 16/542,073

(22) Filed: Aug. 15, 2019

(65) Prior Publication Data

US 2021/0051126 A1  Feb. 18, 2021

(51) Int. Cl.
*H04L 12/18* (2006.01)
*H04L 12/24* (2006.01)
(Continued)

(52) U.S. Cl.
CPC .......... *H04L 12/185* (2013.01); *H04L 12/189* (2013.01); *H04L 12/1886* (2013.01); *H04L 41/12* (2013.01); *H04L 41/16* (2013.01); *H04L 47/15* (2013.01); *H04L 47/806* (2013.01); *H04L 49/201* (2013.01); *H04L 51/14* (2013.01);
(Continued)

(58) Field of Classification Search
CPC ....... H04L 12/18–1895; H04L 12/2861; H04L 41/12; H04L 41/16; H04L 45/16; H04L 45/24; H04L 45/64; H04L 47/15; H04L 47/70; H04L 47/80; H04L 47/806; H04L 49/20–208; H04L 51/14; H04L 65/4076; H04L 67/12–125; H04L 69/14; H04L 69/167; H04L 69/22; H04L 69/26; H04L 69/324; H04L 69/325; H04L 2212/00; H04W 28/02–0226; H04W 40/005–38; H04W 80/02–045; H04W 84/005–22; H04W 88/005–182; H04W 92/02–24
See application file for complete search history.

(56) References Cited

U.S. PATENT DOCUMENTS

| 5,331,637 A | 7/1994 | Francis et al. |
| 6,269,085 B1 | 7/2001 | Provino et al. |

(Continued)

FOREIGN PATENT DOCUMENTS

| EP | 3113412 A1 | 1/2017 |
| JP | 2005229623 | 8/2005 |
| WO | WO2015135816 | 9/2015 |

OTHER PUBLICATIONS

Lorente, Guillermo Gaston et al. "BMRF: Bidirectional Multicast RPL Forwarding", Department of Electronics and Informatics, University of Brussel, Oct. 5, 2016, 16 pages.

(Continued)

*Primary Examiner* — Timothy J Weidner
(74) *Attorney, Agent, or Firm* — Lee & Hayes, P.C.

(57) ABSTRACT

Techniques for limiting forwarding of multicast communications are described herein. For example, the techniques intelligently forward data along paths of a network where members of a multicast group are located. As such, a node that does not lead to members of the multicast group may be configured to selectively and intelligently forward multicast messages it receives. This can reduce network communications, ultimately conserving processing, communication, and/or battery resources of the nodes and improving performance of the network.

20 Claims, 6 Drawing Sheets

(51) Int. Cl.
*H04L 12/801* (2013.01)
*H04L 12/927* (2013.01)
*H04L 12/931* (2013.01)
*H04L 12/58* (2006.01)
*H04L 29/08* (2006.01)
*H04W 28/02* (2009.01)
*H04W 40/24* (2009.01)
*H04W 84/18* (2009.01)

(52) U.S. Cl.
CPC ........... *H04L 67/12* (2013.01); *H04W 28/021* (2013.01); *H04W 40/24* (2013.01); *H04W 84/18* (2013.01)

(56) References Cited

U.S. PATENT DOCUMENTS

| | | | |
|---|---|---|---|
| 6,636,895 | B1 | 10/2003 | Li et al. |
| 7,710,963 | B1 | 5/2010 | Jain et al. |
| 10,616,093 | B2 | 4/2020 | Jadhav et al. |
| 2002/0021697 | A1 | 2/2002 | Tsuchiya et al. |
| 2005/0180447 | A1 | 8/2005 | Lim et al. |
| 2007/0127473 | A1 | 6/2007 | Kessler et al. |
| 2009/0052448 | A1 | 2/2009 | Ramakrishnan et al. |
| 2010/0020797 | A1 | 1/2010 | Casey et al. |
| 2010/0054245 | A1 | 3/2010 | Asati et al. |
| 2012/0039186 | A1 | 2/2012 | Vasseur |
| 2013/0003732 | A1* | 1/2013 | Dholakia ............... H04L 12/18 |
| 2013/0077627 | A1 | 3/2013 | Appalla et al. |
| 2013/0080602 | A1 | 3/2013 | Keesara et al. |
| 2013/0121335 | A1 | 5/2013 | Hui et al. |
| 2013/0227114 | A1 | 8/2013 | Vasseur et al. |
| 2013/0227336 | A1 | 8/2013 | Agarwal et al. |
| 2013/0250949 | A1 | 9/2013 | Farinacci et al. |
| 2014/0126575 | A1 | 5/2014 | Janneteau et al. |
| 2015/0055652 | A1 | 2/2015 | Yong et al. |
| 2015/0200810 | A1* | 7/2015 | Vasseur ................ H04L 12/189 |
| 2016/0142248 | A1 | 5/2016 | Thubert et al. |
| 2016/0149856 | A1 | 5/2016 | Hui et al. |
| 2016/0254987 | A1 | 9/2016 | Eckert et al. |
| 2016/0277201 | A1 | 9/2016 | Thubert et al. |
| 2017/0019804 | A1 | 1/2017 | Morchon et al. |
| 2017/0264532 | A1 | 9/2017 | Guo et al. |
| 2017/0273002 | A1 | 9/2017 | Chen et al. |
| 2018/0054782 | A1 | 2/2018 | Qi et al. |
| 2018/0102965 | A1* | 4/2018 | Hari ..................... H04L 12/185 |
| 2018/0145841 | A1 | 5/2018 | Thubert et al. |
| 2019/0165961 | A1 | 5/2019 | Bartier et al. |
| 2019/0165962 | A1 | 5/2019 | Bartier et al. |
| 2019/0165964 | A1 | 5/2019 | Bartier et al. |
| 2019/0363951 | A1 | 11/2019 | Vasseur et al. |
| 2020/0099543 | A1 | 3/2020 | Taylor et al. |
| 2020/0389332 | A1 | 12/2020 | Bartier et al. |

OTHER PUBLICATIONS

Internet Engineering Task Force (IETF), "Multicast Protocol for Low-Power and Lossy Networks (MPL)," retrieved on Jul. 1, 2019 from <<https://datatracker.ietf.org/doc/rfc7731/>> Feb. 2016, 3 pages.

Internet Engineering Task Force (IETF), "Multicast Using Bit Index Explicit Replication (BIER)," retrieved on Jul. 1, 2019 at <<https://datatracker.ietf.org/doc/rfc8279/>> Last updated Jun. 5, 2018, 3 pages.

IPR Details, "Lars Eggert's Statement about IPR related to draft-ietf-rolltrickle-mcast belonging to Nokia Corporation," retrieved on Jul. 1, 2019 from <<https://datatracker.ietf.org/ipr/1858/>> submitted on Aug. 3, 2012, 3 pages.

IPR, "Document IPR search results for draft-ietf-bier architecture," retrieved on Jul. 1, 20219 from <<https://datatracker.ietf.org/ipr/search/?submit=draft&id=draft-ietf-bier-architecture>> 3 pages.

Office action for U.S. Appl. No. 15/824,696, dated Jan. 26, 2019, Bartier, "Limiting Forwarding of Multicast Communications", 24 pages.

Office action for U.S. Appl. No. 15/824,898, dated Aug. 1, 2019, Bartier, "Multi-Network Operation With Member Node for Multicast Groups", 16 pages.

PCT Search Report and Written Opinion dated Feb. 18, 2019, for PCT Application No. PCT/US2018/062626, 13 pages.

PCT Search Report and Written Opinion dated Mar. 7, 2019 for PCT Application No. PCT/US2018/062638, 12 pages.

Tsvetkov, Tsvetko "RPL: IPv6 Routing Protocol for Low Power and Lossy Networks", Network Architectures and Services, Jul. 2011, 8 pages.

PCT Search Report and Written Opinion dated Nov. 20, 2019, for PCT Application No. PCT/US2019/053004, 12 pages.

Non Final Office Action dated Apr. 29, 2020 for U.S. Appl. No. 16/143,109 "Connecting Multiple Networks for Multicast Groups", Taylor, 14 pages.

PCT Invitation to Pay Additional Fees dated Oct. 20, 2020 for Application PCT/US2020/046680, "Optimized Multicast Group Forwarding", 11 pages.

PCT Search Report and Written Opinion dated Feb. 2, 2021 for PCT Application No. PCT/US20/46680, 18 pages.

\* cited by examiner

OPTIMIZED MULTICAST GROUP FORWARDING

BACKGROUND

Nodes of a network are often configured in a tree-like network structure, such as a Destination Oriented Directed Acyclic Graph (DODAG) with parent nodes, child nodes, and a root node. In many instances, a node belongs to one DODAG, and one network (e.g., one Personal Area Network (PAN)) at a given moment in time. The nodes often communicate multicast data to each other through the DODAG. For example, a node may forward multicast data destined for members of a multicast group to each one of its one-hop neighbors. This can result in a relatively large number of communications, often including between nodes that are not members of the multicast group and possibly are not even in a path to members of the multicast group. This ultimately potentially causes network congestion. And if the nodes are battery-powered, this can increase battery consumption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
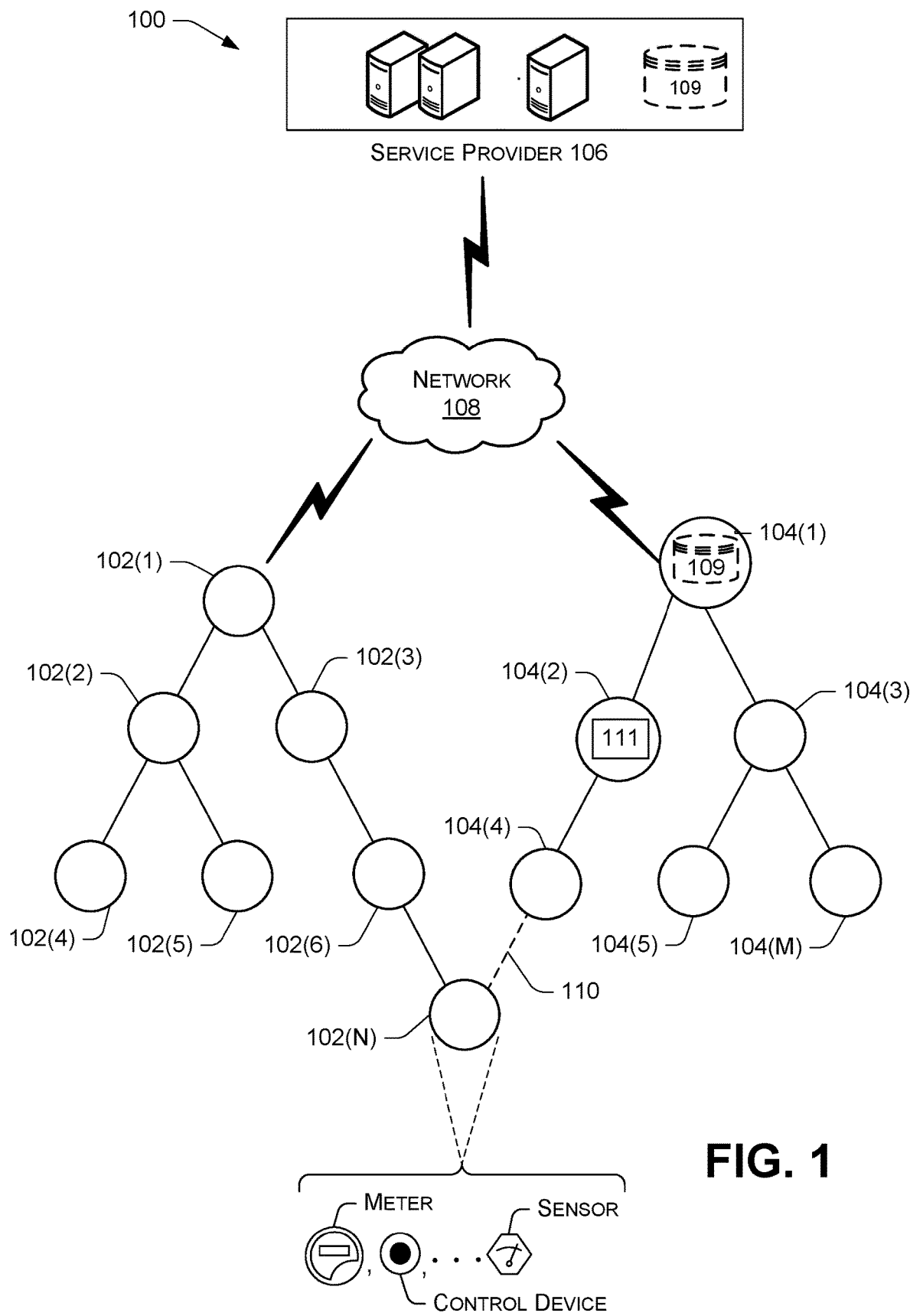
FIG. 1 is a schematic diagram of an example network architecture.

As discussed above, multicast communication within a tree-like network often conventionally requires a large number of communications to reach members of a multicast group. This can cause network congestion and can consume battery power.

This disclosure describes, in part, techniques directed to limiting forwarding of multicast communications. For example, based on a centralized knowledge of the network topology with respect to the nodes in various multicast groups, the techniques configure nodes in the network to intelligently forward multicast data along paths of a network where members of a multi cast group are located. As such, nodes that do not lead to members of the multicast group may be configured to not further distribute the multicast data. This can reduce network communications, ultimately conserving processing, communication, and/or battery resources of the nodes. The reduction in network communications can also minimize congestion of network traffic, improving communication reliability (e.g., by minimizing collisions of network traffic).

The techniques may be implemented in the context of a hierarchal network structure, such as a tree. Each node of the network may be connected wirelessly and/or by wired connection to a parent node and/or child node. Each node may be associated with a hierarchical level, with a root node being associated with the highest level. As communications are sent upward in the network (i.e., uplink—from child-to-parent), the communications travel closer to the root node. Meanwhile, as communications are sent downward in the network (i.e., downlink—from parent-to-child), the communications travel farther from the root node.

In one illustration, the techniques may form a Point-to-Multipoint Sub-Tree (PST) for a multicast group to limit unnecessary data forwarding. The PST may be formed by centralized processing, such as in a border router node or in a service provider system, including in some examples as nodes subscribe and/or unsubscribe to a multicast group. A node may subscribe to (i.e., join) the multicast group by sending a subscription message to advertise membership in the multicast group.

Each node of the network may also maintain a multicast configuration state indicating whether to forward data for a particular multicast group. The multicast configuration maintained by each node is based at least in part on information provided to that node from a central location that is aware of the network topology and multicast group membership. This awareness may have been gained, for example, from the protocol operations used when nodes of the network register as members of the network—such as a RPL (Routing Protocol for Low-Power and Lossy Networks) Target Option of ROLL (Routing over Low Power and Lossy Networks) that, along with the Transit Information Option, can be used to identify specific multicast group membership of a node. See, e.g., RFC 6550 (March 2012), Section 6.7.7 (RPL Target) and Section 6.7.8 (Transit Information).

The multicast configuration may be used by the nodes to limit distribution of multicast data within the network. In particular, the techniques may configure nodes in the network to provide for forwarding of multicast data to only branches that lead to members of a multicast group.

Centralized processing, such as at the service provider 106 or at a root node (such as node 102(1) and/or node 104(1), analyzes the multicast group membership and network topology, such as by using information provided by each node when it registers to be a member of a multicast group. This processing then sends configuration messages (typically by unicast) to nodes of the network, so the nodes can configure themselves for more efficient forwarding of multicast messages. Upon receiving the message from the centralized processing, the node configures itself (e.g., by creating a particular table entry in its multicast forwarding table) so that when a multicast message is received by the node, the node knows how to act upon that multicast message with respect to whether and how to forward the multicast message downstream.

This process may be carried out for any number of multicast groups. For example, a node may be configured to operate in different ways for multicast messages destined for different multicast groups. As such, a particular node may participate in transmission of multicast messages for various multicast groups. In some examples, if the node is not explicitly configured for operation on messages of a particular multicast group, then the node may perform a default operation when such messages are received by the node. The default operation may be, for example, no forwarding. Another example of the default operation is forwarding in a manner similar to the Multicast Protocol for Low-Power and Lossy Networks (MPL) protocol or by classic flooding. See RFC 7731 (February 2016).

In some examples, processing determines a quantity of nodes in the network that are a member of the particular multicast group. Based on the determined quantity, nodes may not be explicitly configured for a multicast message forwarding operation on messages of that multicast group. For example, if a large percentage of nodes in a network are part of the multicast group, then it may be desirable to save the overhead of explicitly configuring the multicast message forwarding by the nodes, since most of the nodes will need to forward messages of this multicast group and can just rely on the example default operation of forwarding.

The techniques are discussed in many instances in the context of a hierarchical tree-like network. For example, the techniques may be implemented within an RPL network where nodes are configured in a DODAG. However, the techniques may be applied to other types of networks, including other types of mesh networks.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communication network, control network, and/or another type of network or system. In one example, the techniques may be implemented in the context of the Internet of Things (IoT).

EXAMPLE ENVIRONMENT

FIG. 1 is a diagram illustrating an example networked environment or architecture 100. The architecture 100 includes network communication devices 102(1)-102(N) (also referred to as nodes 102) associated with a first Area Network (AN) and network communication devices 104(1)-104(M) (also referred to as nodes 104) associated with a second AN, where N and M are each an integer greater than or equal to 1. The network communication devices 102 and/or the network communication devices 104 may communicate with a service provider 106 via one or more networks 108 (e.g., a backhaul network), such as the Internet. The node 102(1) may generally act as a root node to connect the nodes 102 of the first AN to the service provider 106 via the one or more networks 108. Similarly, the node 104(1) may act as a root node to connect the nodes 104 of the second AN to the service provider 106 via the one or more networks 108. For instance, the nodes 102 may be configured in a Destination Oriented Directed Acyclic Graph (DODAG) with the node 102(1) acting as the DODAG root, while the nodes 104 may also be configured in a DODAG with the node 104(1) acting as the DODAG root. The node 102(1) and/or the node 104(1) may comprise an edge device.

As used herein, the term "Area Network" (AN) refers to a defined group of devices that are in communication with one another via one or more wired or wireless links. Examples of ANs include, for example, Local Area Networks (LANs), Wide Area Networks (WANs), Neighborhood Area Networks (NANs), Personal Area Networks (PANs), Home Area Networks (HANs), Field Area Networks (FANs), and so on. In some instances, multiple ANs exist and collectively define a larger network, such as an advanced metering infrastructure (AMI) of a utility communication network. In general, a network communication device is a member of a particular AN. Although in some instances, a network communication device may be a member of multiple ANs. Further, over time, network communication devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path, including a wired path over which communication may occur according to a power line communication (PLC) protocol. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The plurality of channels may include a data channel(s) and/or a control channel(s) that is designated for communicating messages to specify the data channel(s) to be utilized to transfer data. Transmissions on a control channel may be shorter relative to transmissions on a data channel. The AN may implement a channel hopping sequence, such that a channel may change over time.

The service provider 106 may provide remote resources to the network communication devices 102 and/or 104. In some instances, the service provider 106 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices 102 and/or 104 may register or interact with some or all of these one or more central office systems. In one example, the one or more central office systems may implement a meter data management system to collect resource consumption data (e.g., data regarding usage of water, gas, electricity, etc. at a meter) from the network communication devices 102 and/or 104, process the resource consumption data, provide data regarding resource consumption to customers, utilities, and others, and/or perform a variety of other functionality. In other instances, the service provider 106 comprises other systems to implement other functionality, such as web services, cloud services, and so on. In yet other instances, the service provider 106 may be implemented as other types of devices, such as in the context of the Internet of Things (IoT) that allows a variety of devices to exchange data. In some instances, the service provider 106 may be referred to as a central agent.

The service provider 106 may be physically located in a single central location or may be distributed at multiple different locations. The service provider 106 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

The service provider 106 may be implemented as one or more computing devices including servers, desktop computers, or the like that include one or more processors executing computer program instructions. In one example, the service provider 106 is configured in a server cluster, server farm, data center, mainframe, cloud computing environment, or a combination thereof. To illustrate, the service provider 106 may operate as a cloud computing device that provides cloud services, such as storage, processing, and so on.

The network communication devices 102, the network communication devices 104, and/or the service provider 106 may transmit and/or receive Protocol Data Units (PDUs). A PDU may comprise a bit, frame, packet, segment, or another unit of data. A PDU may include control data and/or payload data. As used herein, a message, transmission, communication, or the like may refer to any type of PDU.

The network communication devices 102, the network communication devices 104, and/or the service provider 106 may perform various operations to facilitate the techniques discussed herein. For example, any of the network communication devices 102 and/or 104 may form a Point-to-Multipoint Sub-Tree (PST) for a multicast group and/or distribute multicast data according to the PST. Additionally, or alternatively, the first AN of the nodes 102 may connect to the second AN of the nodes 104, such as through a link 110. Furthermore, as shown with respect to network communication device 104(2), but which may be provided in any or all of the network communication devices 102 or 104, a multicast forwarding table 111 may be provided whose contents indicate how a node 102 or 104 is to forward multicast data messages.

The service provider 106 and/or network communication device 102 and/or 104 may include a database or other data store 109 that holds data indicating a topology of the network communication devices 102 and/or 104, and the data store 109 may also include data indicating multicast group membership of the network communication devices 102 and/or 104. For ease of illustration, for the network communication devices 102 and/or 104, only network communication device 104(1) is shown in FIG. 1 as including the data store 109. However, the data store 109 may be included in any one or more of the network communication devices 102 and/or 104. The data store 109 may be interrogated or otherwise processed to optimize forwarding of multicast communications.

Although the techniques are discussed in many instances with the ANs being implemented as tree-like structures having parent and child nodes, such as DODAGs, in some instances the ANs may be implemented in different network structures. For example, an AN may be implemented in whole or part by other types of networks, such as hub-and-spoke networks, mobile networks, cellular networks, etc. Regardless of the topology of an AN, individual network communication devices may communicate by wireless (e.g., radio frequency) and/or wired (e.g., power line communication, Ethernet, serial, etc.) connections.

EXAMPLE NETWORK COMMUNICATION DEVICE

Figure 2:
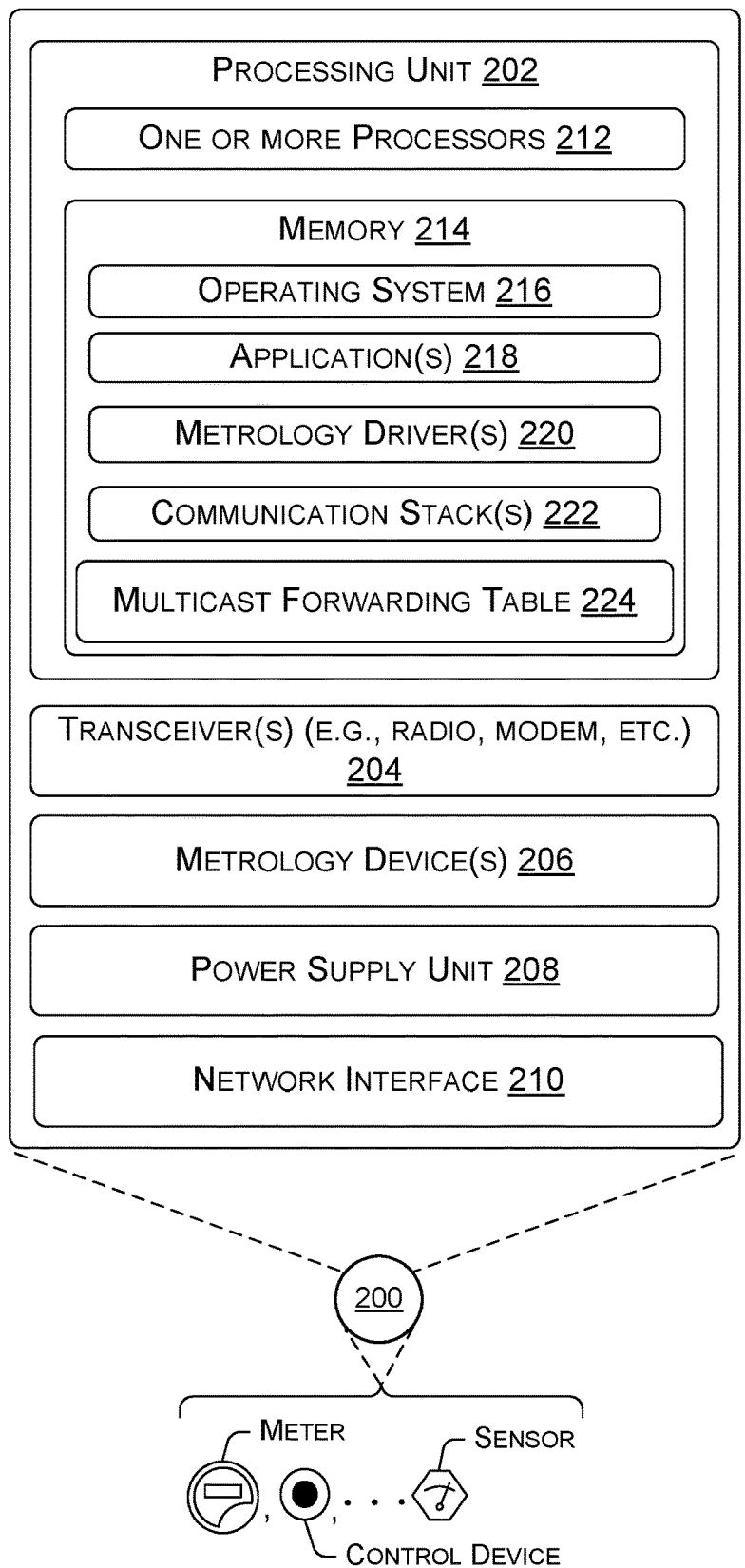
FIG. 2 is a diagram showing details of an example network communication device.

FIG. 2 is a diagram showing details of an example node 200, such as any of the network communication devices 102 and/or the network communication devices 104 of FIG. 1. The node 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a transformer, a repeater, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a smart home device (e.g., personal assistant devices, security systems, doorbells, smoke alarms, etc.), a server, an access point, a portable navigation device, a gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on. In some examples, the node 200 is implemented as an edge device, such as a FAR, a cellular relay, a cellular router, an edge router, a DODAG (Destination Oriented Directed Acyclic Graph) root, a root device, and so on.

In some instances, the node 200 comprises a Limited Function Device (LFD), while in other instances the node 200 comprises a Full Function Device (FFD). An FFD may include more functionality/resources than an LFD, such as different processing powers, processing capabilities, power reliance, etc. In one example, an FFD is implemented as Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life.

While FFDs and LFDs may have the similar components, the components may differ due to the different constraints. As one example, while both an FFD and an LFD have transceivers, the specific transceivers used may be different. For instance, a transceiver on an FFD may include a PLC modem, while a transceiver on an LFD does not because it is not connected to an electrical power line that could be used for PLC communications. Additionally, or alternatively, a transceiver on an LFD may employ a lower power RF radio than and FFD to minimize energy consumption. Further, other components of the FFDs and LFDs may vary. In some instances, an LFD is implemented with less functionality and/or include less hardware components than an FFD. Further, in some instances components of an LFD are lower power components than the corresponding components of an FFD.

In one example of the architecture 100 of FIG. 1, the nodes 102(1) and 104(1) each comprise an FFD, and the nodes 102(2)-102(N) and the nodes 104(2)-(M) each comprise an LFD. In another example, the nodes 102(1) and 104(1) each comprise an LFD, and the nodes 102(2)-102(N) and the nodes 104(2)-(M) comprise one or more LFDs and/or FFDs.

As shown in FIG. 2, the example node 200 includes a processing unit 202, a transceiver 204 (e.g., radio, modem, etc.), one or more metrology devices 206, a power supply unit 208, and a network interface 210. The processing unit 202 may include one or more processors 212 and memory 214. The one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in an AN or another network. The transceiver 204 may additionally or alternatively include a modem to provide power line communication (PLC) communication with other network communication devices that are connected to an electrical service grid.

The metrology device(s) 206 may comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver 204 and/or the network interface 210. The consumption data may be formatted and/or packetized in a manner or protocol for transmission.

The power supply unit 208 may provide power to the node 200. In some instances, such as when the node 200 is implemented as a FFD, the power supply unit 208 comprises a mains power connector that couples to an Alternating Current (AC) or Direct Current (DC) mains power line where the node 200 is installed. In other instances, such as when the node 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 214 includes an operating system (OS) 216 and one or more applications 218 that are executable by the one or more processors 212. The memory 214 may also include one or more metrology drivers 220 configured to receive, interpret, and/or otherwise process metrology data collected by the metrology device(s) 206. Additionally, or alternatively, the one or more applications 218 may be configured to receive and/or act on data collected by the metrology device(s) 206.

The memory 214 may also include one or more communication stacks 222. In some examples, the communication stack(s) 222 may be configured to implement a 6LowPAN protocol, an 802.15.4-2015 protocol, and/or another protocol. However, in other examples, other protocols may be used, depending on the networks with which the node 200 is intended to be compatible. The communication stack(s) 222 describe the functionality and rules governing how the node 200 interacts with each of the specified types of networks. For instance, the communication stack(s) 222 may cause network communication devices to operate in ways that minimize battery consumption of the network communication devices when they are connected to these types of networks.

The memory 214 may also store other information. For example, the memory 214 may include a multicast forwarding table 224 whose contents indicate how a node 200 is to forward multicast data messages, and so on.

In some instances, the node 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The various memories described herein (e.g., the memory 214) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices (e.g., the node 200) are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing.

By way of example and not limitation, the node 200 may implement a variety of modulation techniques and/or data rates, such as frequency-shift keying (FSK) 802.15.4g (e.g., mandatory mode with a data rate of 50 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

EXAMPLE POINT-TO-MULTIPOINT PAN WITH MULTICAST MEMBERSHIP

Figure 3:
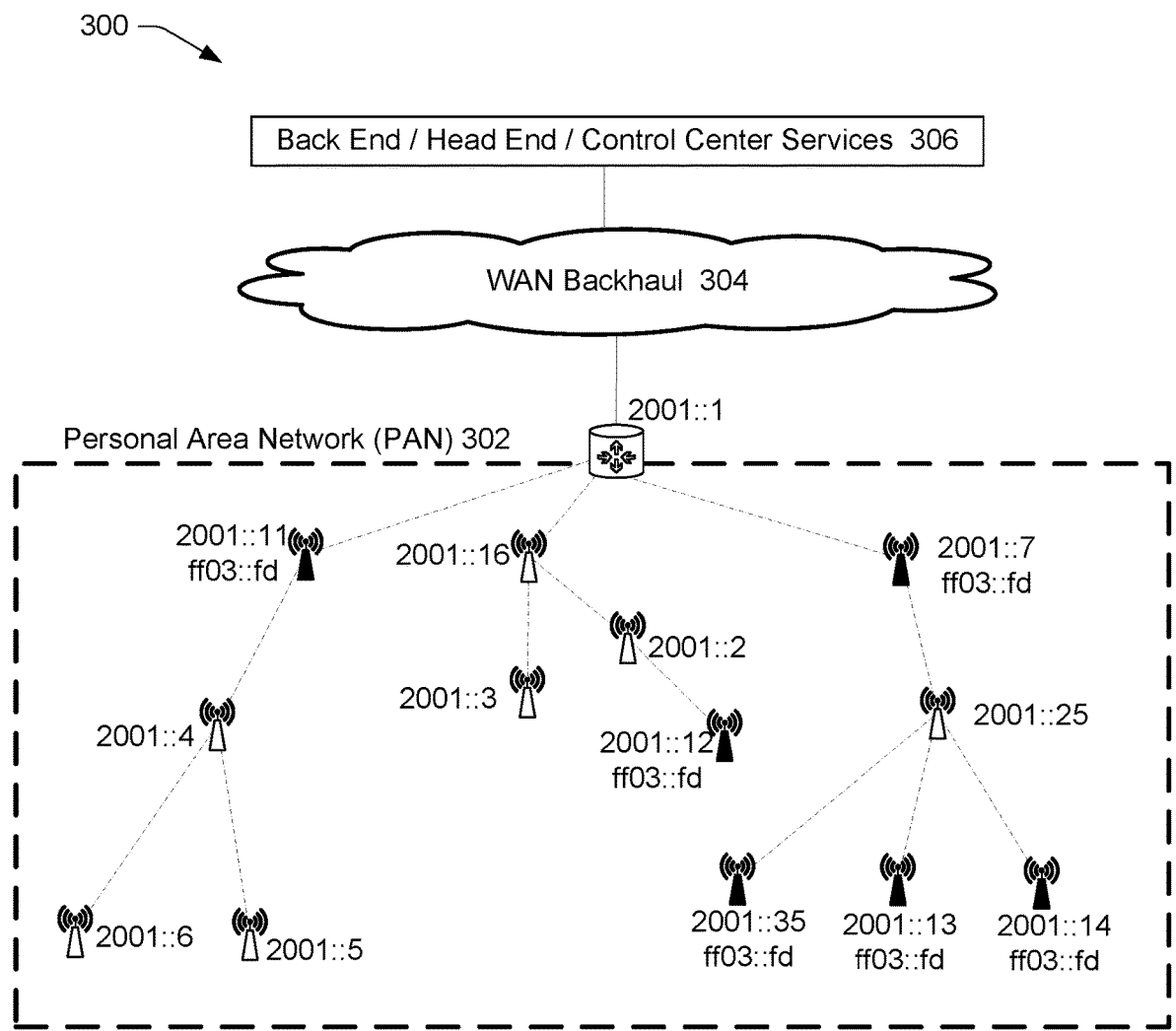
FIG. 3 illustrates an example network configuration of nodes.

FIG. 3 illustrates an example network configuration 300 useful for illustrating aspects of the invention. A Personal Area Network (PAN) 302 is formed of various nodes each having an address of the form 2001::x, where x is an integer. Each of the nodes shown may be a Layer 3 Mesh Router, except for the node having address 2001::1 may be a Border Router Node. The Border Router Node 2001::1 provides a data path, via a Wide Area Network (WAN) Backhaul 304, to a Back End/Head End/Control Center Services 306. Furthermore, nodes indicated by ff03::fd are members of a multicast group, and some nodes are not a member of any multicast group. For simplicity of illustration, possible membership in only one multicast group is illustrated. The techniques described here, however, are applicable to networks where at least some nodes have membership in multiple multicast groups.

Determination of Node Configuration for Selective Multicast Forwarding

Figure 4:
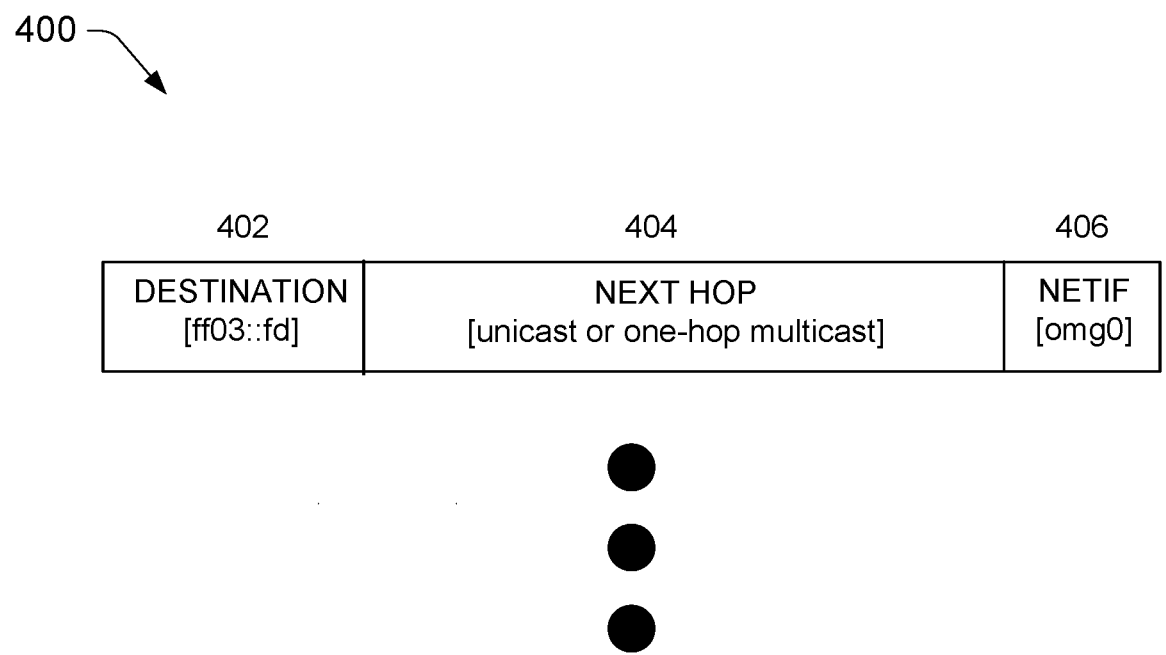
FIG. 4 illustrates an example node configuration table entry, which indicates to a node how to forward multicast messages the node receives that are destined for a particular multicast group destination.
Figure 5:
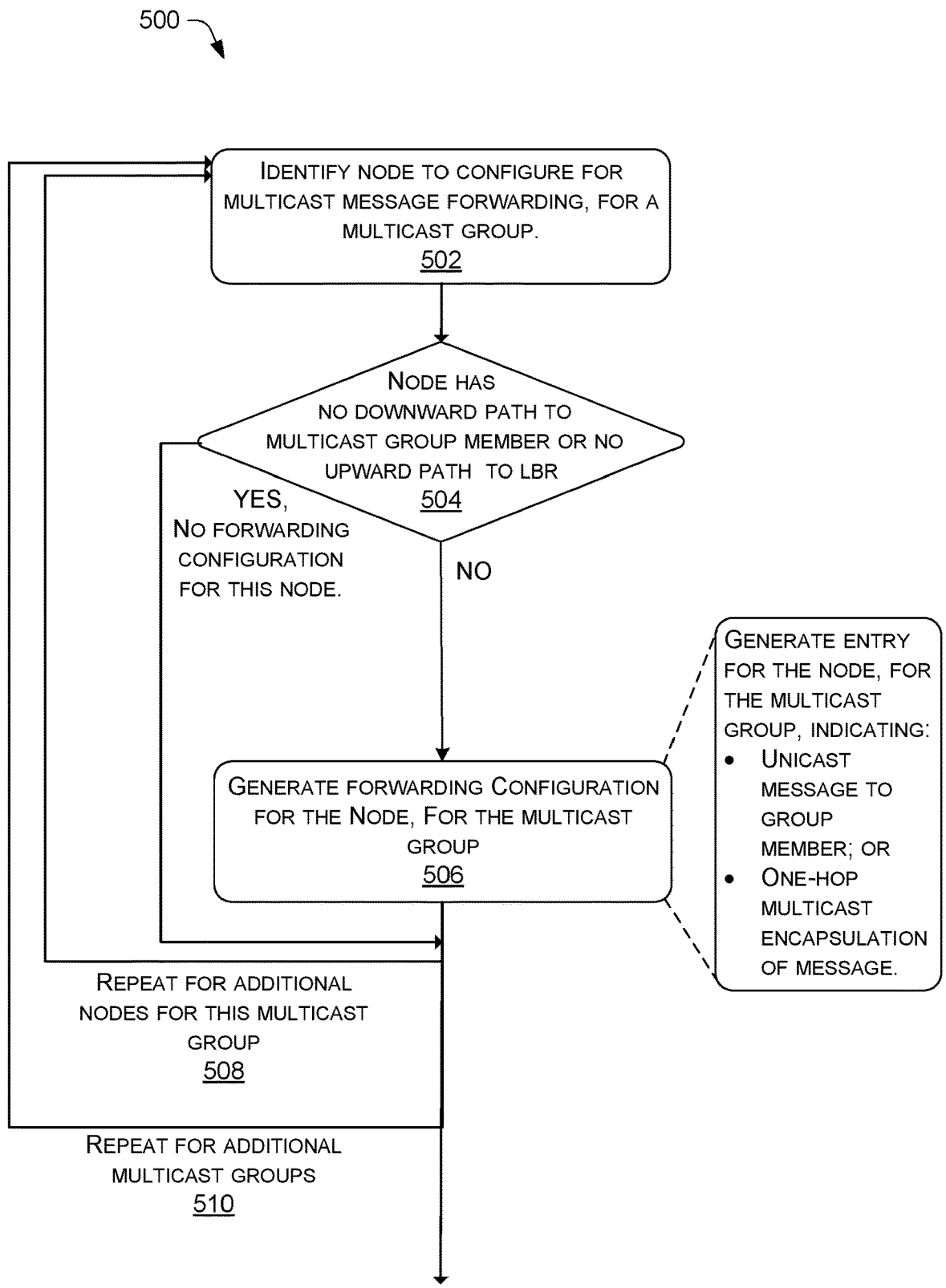
FIG. 5 illustrates an example process to determine a forwarding configuration for a node for possible multicast group destinations.

FIG. 3, FIG. 4 and FIG. 5 illustrate an example of how a configuration of nodes of the PAN 302 may be determined to intelligently forward multicast data along paths of a network where members of a multicast group are located. The node configuration determination process for selective multicast forwarding may be performed, for example, by one or more computing devices associated with the service provider 106. In some examples the node configuration process for selective multicast forwarding may be performed by a node in the networks such as by a border router node, executing computer program instructions. In some examples, the node configuration process for selective multicast forwarding may be performed by some other computing device or devices.

FIG. 4 is an example node configuration table entry 400, which configures a node for forwarding multicast messages the node receives that are destined for a particular multicast group destination. While the discussion of node configurations is in the context of a table, this is exemplary only and other organizations of the configuration data may be employed. In one example, the use of a table such as is described is convenient because this forwarding table construct for IPv6 data traffic is already present in the Linux operating system.

Referring now to the specific fields of the node configuration table entry 400, field 402 indicates a multicast group destination. For the FIG. 4 example table entry 400, the multicast group destination in field 402 is ff03::fd, as shown in the square brackets. Field 404 indicates how the node should forward messages it receives that are destined for the multicast group destination in field 402. Field 406 indicates to which port the node should transmit the multicast message (in the example, interface omg0). As indicted by the "dot-dot-dot" in FIG. 4, additional entries 400 may be provided to configure the node for forwarding received multicast messages destined for other multicast group destinations.

The absence of a node configuration table entry 400 for a particular multicast group destination may signify to the node to apply a default operation on a received multicast message for that particular multicast group destination. One example of a default operation is to drop the received multicast message, i.e., not forward it. Another example of a default operation is to flood the multicast message to all neighboring nodes. In other examples, there may an explicit entry to indicate to a node to drop a received multicast message or to take perform some other operation with respect to a received multicast message for a particular multicast group destination.

FIG. 5 illustrates an example process in which, for each node (and each multicast group) for which a forwarding configuration is to be determined for forwarding multicast messages, the example process (FIG. 5) is carried out with respect to that node to determine a forwarding configuration (FIG. 4) for that node for possible multicast group destinations. The FIG. 5 example process may be carried out in a central location of a network. For example, referring to FIG. 3, the FIG. 5 example process could be carried out by the Back End/Head End/Control Center Services 306 or by Border Router Node 2001::1. In any case, the process for generating forwarding configurations typically has access to information regarding the multicast group membership and the topology of the network.

Turning now to FIG. 5, at 502, a node of a network is identified to configure for multicast message forwarding, for a particular multicast group. Generally, in order to fully configure a network for multicast message forwarding, each node in the network will be considered in the FIG. 5 process, and that node will be configured (or not) for all possible multicast groups of which nodes in the network are members. At 504, it is determined whether the identified node has no downward path to a member of the multicast group or no upward path to a local border router. If the determination at 504 is negative, then a configuration is generated for the node at 506, for the multicast group. In one example, this generated configuration either indicates a unicast transmission to a member of the multicast group or indicates a one-hop encapsulation of the multicast message.

In some examples, if there is only one neighbor or a limited number of neighbors of the node that lead to a multicast group member, then it may be more efficient to indicate one or more unicast transmissions to the relevant neighbor node(s) rather than a multicast transmission. On the other hand, if the determination at 504 is affirmative (i.e., either no such downward path or upward path), then no configuration is required for this node, for the multicast group, and 506 is bypassed. (In some examples, the "yes" branch from 504 includes an operation to create an explicit indication of how the node is to operate with respect to multicast messages destined to a particular multicast group.) Processing returns (508) to 502 until every node desired to be configured for multicast forwarding is considered. The FIG. 5 process is then repeated (510) for all other possible multicast groups. It should be noted that FIG. 5 shows one process for visiting nodes of a network, but it is also possible to consider every multicast group when considering an identified node, i.e., interchanging the arrows 508 and 510 in FIG. 5.

Representations of the generated configurations are provided, either during the FIG. 5 process or after completion of the FIG. 5 process, to each respective node of the network. In one example, a unicast message is generated to each node for which a multicast forwarding configuration was generated, to provide that node the corresponding multicast forwarding configuration. Upon receiving the configuration, each node populates its multicast forwarding table in accordance with the received multicast forwarding configuration.

Figure 6:
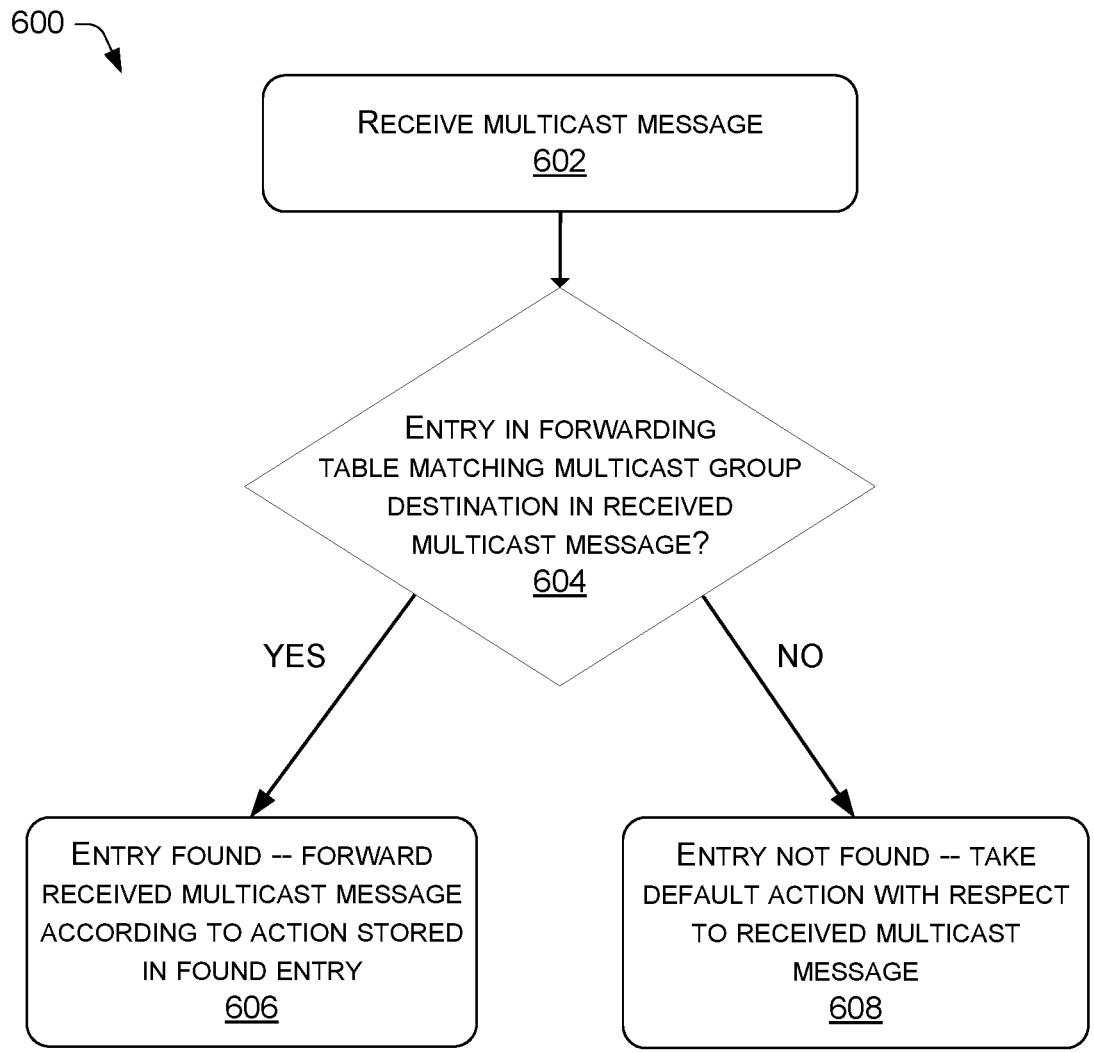
FIG. 6 illustrates an example of how a node in a network having an example configuration table such as shown in FIG. 4 may operate with respect to multicast messages.

FIG. 6 illustrates an example of how a node in the network, having an example configuration table such as shown in FIG. 4, may operate with respect to multicast messages. At 602, the node receives a multicast message. At 604, the node looks for an entry in the node's multicast forwarding table that matches the multicast group destination in the received multicast message. At 606, if such an entry is found, the node encapsulates the original message then forwards the encapsulated multicast message according to the action stored in the found entry. For example, as discussed relative to FIG. 4, the entry may indicate the action of forwarding the received multicast message by unicast or of forwarding the received message by one hop multicast. That is, the node encapsulates and forwards, by unicast, multicast messages for the particular multicast group. For example, the original multicast message may be encapsulated in an IPv6-in-IPv6 unicast message, so that the original source/destination addresses of the multicast message is preserved. The node then forwards the encapsulated message using either multicast or unicast as the forwarding rule dictates. If an entry matching the multicast group destination in the received multicast message is not found in the node's multicast forwarding table, at 606, a default action is taken on the received multicast message.

Some examples of the FIG. 6 process, for various illustrative nodes of the FIG. 3 example network configuration, are now provided, looking first at the node having address 2001::1 (referred to by shorthand as "the 2001::1 node"). the local border router, when it receives a multicast message having group ff03::fd as the multicast destination. Because the 2001::1 node is a path to more than one node that is a member of multicast group ff03::fd, the forwarding table entry for multicast group ff03::fd in the 2001::1 node is as follows:

| DESTINATION | NEXT HOP | NETIF |
|---|---|---|
| ff03::fd | ff02::x (IANA) | omg0 |

The notation ff02::x (IANA) signifies transmission to a multicast group whose number must be assigned by the Internet Assigned Numbers Authority (IANA). When node 2001::1 receives a message having multicast group destination ff03::fd, node 2001::1 encapsulates the message and forwards it by multicast on interface omg0.

Turning now to the node having address 2001::11, in the multicast destination group ff03::fd, if the 2001::11 node receives a message having group ff03::fd as its multicast destination, there are no additional nodes to which such a multicast message needs to be forwarded. That is, none of the nodes downstream from the 2001::12 node (i.e., the 2001::4 node, the 2001::6 node and the 2001::5 node) is a member of the multicast destination group ff03::fd. Therefore, there is no entry in the multicast forwarding table of the 2001::11 node for multicast destination group ff03::fd. With respect to encapsulation/forwarding, due to their being no entry in the multicast forwarding table of the 2001::11 node for multicast destination group ff03::fd, the 2001::11 node takes the default action on the multicast message having destination group ff03::fd, which is typically to not forward it. This is in spite of the fact that the multicast message having destination group ff03::fd should be consumed by the 2001:11 node itself. The consumption operation may generally be handled by network protocols as an operation separate from the forwarding operation. For example, even if the 2001::11 node does not forward the received multicast message, the message may be passed up the node's protocol stack, so that the 2001::11 node may otherwise consume the message.

Now taking another example, looking at the 2001::7 node, this node is a member of the multicast destination group ff03::fd (which is irrelevant for forwarding determinations), and it has three distant downstream nodes (the 2001::35, 2001::13 and 2001::14 nodes) that are a member of the multicast destination group ff03::fd If the 2001:7 node receives a multicast message having group ff03::fd as its multicast destination, the multicast message needs to be forwarded to only the 2001::25 node, so that the multicast message can ultimately reach the 2001::35, 2001::13 and 2001::14 nodes. In accordance with one example configuration, since the 2001::7 node need only forward the multicast message to one downstream neighbor (the 2001::25 node), the 2001::7 node provides the message to the 2001::25 as a unicast message. So the forwarding entry in the 2001::7 node for any message having group ff03::fd as its multicast destination is:

| DESTINATION | NEXT HOP | NETIF |
|---|---|---|
| ff03::fd | 2001::25 (unicast) | omg0 |

When the 2001::7 node receives a message having multicast group destination ff03::fd node 2001::7 encapsulates and forwards the message by unicast, on interface omg0, to the 2001::25 node.

The final example described is the 2001::25 node. This node is not a member of the multicast destination group ff03::fd and it has three immediate downstream nodes (the 2001::35, 2001::13 and 2001::14 nodes) that are members of the multicast destination group ff03::fd. If the 2001::25 node receives a multicast message having group ff03::fd as its multicast destination, the multicast message needs to be encapsulated and forwarded to those three immediate downstream nodes. Therefore, the 2001::25 node forwards the received message as a multicast message. So the forwarding entry in the 2001::25 node for any message having group ff03::fd as its multicast destination is:

| DESTINATION | NEXT HOP | NETIF |
|---|---|---|
| ff03::fd | ff02::x (IANA) | omg0 |

When the 2001::25 node receives a message having multicast group destination 1, node 2001::1 forwards the message by multicast on interface omg0.

The processes 500 and 600 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

What is claimed is:

1. A method of configuring a network to handle multicast messages, the method comprising:
for a first routing node of a plurality of routing nodes of the network, based at least in part on analyzing an indication of multicast group membership and an indication of topology of the network, determining if the first routing node is an ancestor node to a node that is a member of a particular multicast group;
based at least in part on a result of the determining,
creating a multicast forwarding configuration for the first routing node, the multicast forwarding configuration for the first routing node including:
an indication of the particular multicast group; and
an indication of a forwarding operation for the first routing node to carry out on multicast messages associated with the particular multicast group, received by the first routing node, wherein the forwarding operation includes at least a drop operation; and
causing a representation of the created multicast forwarding configuration for the first routing node to be provided to the first routing node.

2. The method of claim 1, further comprising:
for a second routing node of the plurality of routing nodes of the network, based at least in part on analyzing the indication of multicast group membership and the indication of topology of the network, determining if the second routing node is an ancestor node to a node that is a member of the particular multicast group;
based at least in part on a result of the determining for the second routing node;
creating a multicast forwarding configuration for the second routing node, the multicast forwarding configuration for the second routing node including:
an indication of the particular multicast group; and
an indication of a forwarding operation for the second routing node to carry out on multicast messages associated with the particular multicast group, received by the second routing node; and
causing a representation of the created multicast forwarding configuration for the second routing node to be provided to the second routing node.

3. The method of claim 2, wherein:
the indication of the forwarding operation for the second routing node is at least one of a group of unicast transmission, one hop multicast transmission, and no forwarding.

4. The method of claim 1, wherein:
the particular multicast group is a first particular multicast group, and
the method further comprising creating the multicast forwarding configuration and providing the representation of the multicast forwarding configuration for a second particular multicast group.

5. The method of claim 1, further comprising:
determining a quantity of nodes in the network that are a member of the particular multicast group.

6. The method of claim 5, further comprising:
based on the determined quantity, determining whether to perform the operations of determining whether the first routing node is an ancestor node and creating a multicast forwarding configuration for the first routing node.

7. A computing device programmed to execute operations to configure a network to handle multicast messages, the operations comprising:
for a first routing node of a plurality of routing nodes of the network, based at least in part on analyzing an indication of multicast group membership and an indication of topology of the network, determining if the first routing node is an ancestor node to a node that is a member of a particular multicast group;
based at least in part on a result of the determining,
creating a multicast forwarding configuration for the first routing node, the multicast forwarding configuration for the first routing node including:
an indication of the particular multicast group; and
an indication of a forwarding operation for the first routing node to carry out on multicast messages associated with the particular multicast group, received by the first routing node, wherein the forwarding operation includes at least a drop operation; and
causing a representation of the created multicast forwarding configuration for the first routing node to be provided to the first routing node.

8. The computing device of claim 7, the operations further comprising:
for a second routing node of the plurality of routing nodes of the network, based at least in part on analyzing the indication of multicast group membership and the indication of topology of the network, determining if the second routing node is an ancestor node to a node that is a member of the particular multicast group;
based at least in part on a result of the determining for the second routing node,
creating a multicast forwarding configuration for the second routing node, the multicast forwarding configuration for the second routing node including:
an indication of the particular multicast group; and
an indication of a forwarding operation for the second routing node to carry out on multicast messages associated with the particular multicast group, received by the second routing node; and
causing a representation of the created multicast forwarding configuration for the second routing node to be provided to the second routing node.

9. The computing device of claim 8, wherein:
the indication of the forwarding operation for the second routing node is at least one of a group of unicast transmission, one hop multicast transmission, and no forwarding.

10. The computing device of claim 7, wherein:
the particular multicast group is a first particular multicast group, and
the operations further comprising creating the multicast forwarding configuration and providing the representation of the multicast forwarding configuration for a second particular multicast group.

11. The computing device of claim 7, the operations further comprising:
determining a quantity of nodes in the network that are a member of the particular multicast group.

12. The computing device of claim 11, the operations further comprising:
based on the determined quantity, determining whether to perform the operations of determining whether the first routing node is an ancestor node and creating a multicast forwarding configuration.

13. A method of operating a network, comprising:
receiving, via a radio of a routing node, a multicast message addressed to a particular multicast group;
based at least in part on a forwarding configuration stored at the routing node and indicating whether the routing node is an ancestor node to a node that is a member of the particular multicast group, determining whether the routing node is to drop the multicast message; and
based at least in part on the determining, forwarding, via the radio of the routing node, the multicast message in accordance with the forwarding configuration, the forwarding configuration further indicating a forwarding operation, associated with the indication of the particular multicast group, for the routing node to carry out on multicast messages received by the routing node addressed to the particular multicast group.

14. The method of claim 13, further comprising:
receiving, via the radio of the routing node, the forwarding configuration; and
storing the forwarding configuration in a memory of the routing node.

15. The method of claim 13, wherein the forwarding operation is at least one of a group of unicast transmission and one hop multicast transmission.

16. The method of claim 13, wherein:
the particular multicast group is a first particular multicast group and there is no forwarding configuration stored at the routing node for a second particular multicast group; and
the method further comprises:
receiving, via the radio of the routing node, a multicast message addressed to the second particular multicast group; and
forwarding, via the radio of the routing node, the multicast message addressed to the second particular multicast group according to a default forwarding operation of the routing node.

17. The method of claim 16, wherein the default forwarding operation is forwarding by one hop multicast transmission.

18. The method of claim 13, wherein:
the particular multicast group is a first particular multicast group, and
the method further comprises:
receiving, via the radio of the routing node, a message addressed to a second particular multicast group; and
forwarding, via the radio of the routing node, the multicast message addressed to the second particular multicast group, in accordance with the forwarding configuration stored at the routing node, the forwarding configuration indicating the second particular multicast group and a forwarding operation, associated with the indication of the second particular multicast group, for the routing node to carry out on messages received by the routing node addressed to the second particular multicast group.

19. The method of claim 18, wherein the forwarding operation associated with the indication of the second particular multicast group is the same as the forwarding operation associated with the indication of the first particular multicast group.

20. The method of claim 18, wherein the forwarding operation associated with the indication of the second particular multicast group is different from the forwarding operation associated with the indication of the first particular multicast group.

* * * * *